United States Patent
Ritter et al.

[15] 3,676,632
[45] July 11, 1972

[54] PROCESS FOR MANUFACTURING WELDED MESH

[72] Inventors: Klaus Ritter; Hans Gott; Josef Ritter; Gert Ritter, all of Graz, Austria

[73] Assignee: EVG Entwicklungs-und Verwertungsgesellschaft GmbH, Graz, Austria

[22] Filed: July 10, 1970

[21] Appl. No.: 53,856

[30] Foreign Application Priority Data

July 15, 1969 Austria ..............................A 6809/69

[52] U.S. Cl..................................................219/58, 219/56
[51] Int. Cl........................................................B23k 1/00
[58] Field of Search......................................219/56, 57, 58

[56] References Cited

UNITED STATES PATENTS 1,878,760   9/1932   Cosgrove et al. ..................219/56

Primary Examiner—R. F. Staubly
Assistant Examiner—Hugh D. Jaeger
Attorney—Ernest F. Marmorek

[57] ABSTRACT

The invention relates to the manufacture of welded wire mesh for use as concrete reinforcement. The mesh is manufactured by advancing an array of longitudinal wires through a welding machine having a row of electrodes and welding transverse wires to the array by means of resistence welding. To avoid embrittlement of the material of the wires in the region of the weld due to rapid temperature changes, preheaters are provided for preheating the longitudinal wires where the welding is to take place. The preheaters are movable mounted and preheat the longitudinal wires during at least a part of their advance through the machine.

In one example the longitudinal wires are advanced intermittently past stationary welding electrodes and the preheaters alternately advance with the wires and then return to an initial position. In a second example the longitudinal wires are advanced continuously through the machine and both the electrodes and the preheaters alternately advance with the wires and return to initial positions. The alternating advance and return of the preheaters may be out of phase with respect to that of the electrodes.

15 Claims, 11 Drawing Figures

INVENTORS:
Klaus Ritter et al,

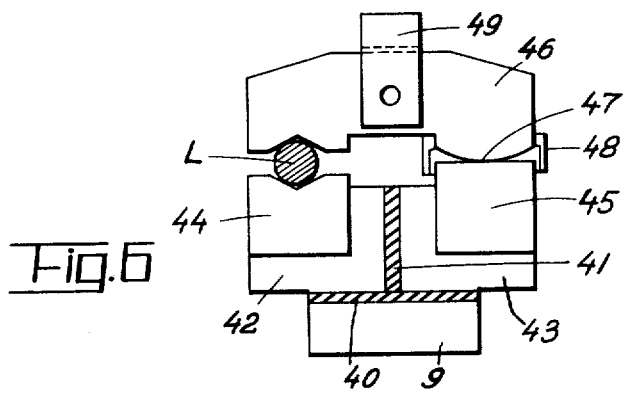
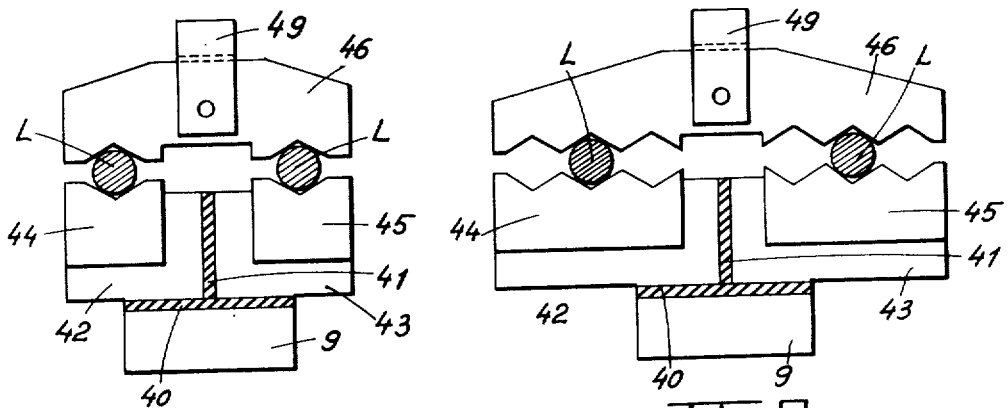
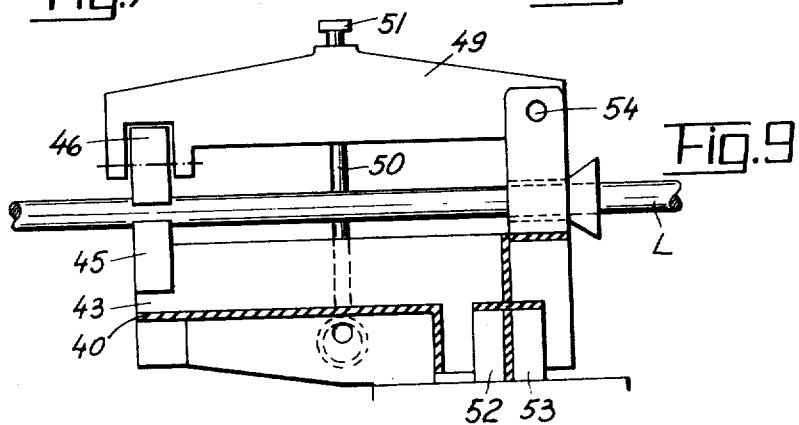

INVENTORS:
Klaus Ritter et al,
BY
   Their Attorney.

PROCESS FOR MANUFACTURING WELDED MESH

This invention relates to the manufacture of welded mesh for concrete reinforcement, by electric resistance welding, in which transverse wires are welded to an array of longitudinal wires by means of a transverse row of electrodes.

In resistance welding self hardening or highly alloyed steels, for example self-hardening high carbon steels, the steel tends to become brittle in the region of the weld, particularly due to the formation of martensite. This is due to the sudden local heating of the steel in the region of the weld, followed by abrupt cooling, resulting in undesired changes in crystalline structure.

To get around this difficulty in the welding of self-hardening steels it has been proposed to preheat the more massive of the two bodies before welding them together, so that the heated part of the more massive body cools at a slower rate, in closer conformity with the cooling of the hot part of the less massive body.

For this purpose it has been proposed, in particular in regard to the welding together of crossed wires, to preheat the thicker wire, after it has reached the welding position but before the welding takes place, by passing through it axially an electric preheating current. As an alternative it has been proposed to preheat the thicker wire locally before it reaches the welding position, by means of a stationary induction coil through which the wire is led.

However neither of these two proposals is entirely satisfactory. Preheating the thicker wire after it has reached the welding position, but before welding, by passing a heating current through it axially, consumes excessive energy because the axial length of wire which is preheated is greater than necessary. A further disadvantage of this method is that the three operations have to take place in succession, that is to say the wire advance, the preheating and finally the welding. The three operations performed successively take up a great deal of time and the output of the machine is consequently low. To summarize, the disadvantages of this method are the high energy consumption and the low throughput of the machine.

Preheating the thicker wire by means of a stationary induction coil situated at a distance upstream of the welding position consumes even more energy, because the preheated wire cools during its journey between the induction coil and the welding position. By this method the preheating and the welding can be done simultaneously, at two positions on the longitudinal wire, but the wire cannot be advanced during this double operation. The entire process, that is to say the wire advance, followed by the preheating and welding, therefore takes place in two successive stages, again limiting the throughput of the machine.

In accordance with the invention the longitudinal wires are advanced and are simultaneously preheated over an axial length of the wires which corresponds substantially to the axial length which is subsequently welded to a transverse wire, by means of a heating device which travels along with the longitudinal wires during at least part of their advance.

In this way only the axial lengths of the longitudinal wires where the welding is to take place need be preheated, and time is saved, and throughput therefore increased, in that the preheating is done simultaneously with advance of the longitudinal wires. The fact that the heating device travels along with the wire allows the heating period to be longer than was practicable with earlier methods. The heating device preferably travels along with the wire to quite near the welding electrodes, leaving the preheated part of the wire only a small further distance to travel before it reaches the welding position. The wire then has only a short time to cool off again.

The method according to the invention can be employed in a mesh welding machine comprising a drive for advancing the longitudinal wires, feed guides for feeding the transverse wires, at least one transverse row of welding electrodes, and preheating devices which are arranged to travel along with the longitudinal wires and to preheat limited axial lengths of the longitudinal wires.

In the case of a welding machine in which the longitudinal wires are advanced intermittently through a distance which corresponds to the spacing between the transverse wires, the local preheating of the longitudinal wires is preferably terminated shortly before the preheated lengths reach the row of electrodes. The heating devices are then returned to their initial positions while the longitudinal wires continue to advance until the preheated zones reach the welding electrodes, whereupon the welding is performed. The heating devices, starting out from their initial positions, can then heat the longitudinal wires during a period which overlaps the welding period.

In the case of a welding machine in which the longitudinal wires are advanced continuously, the welding electrodes and the preheating devices may both be arranged to travel alternately forwards with the advancing longitudinal wires and backwards to initial positions. In this process the heating devices can if desired begin returning before the welding electrodes begin returning, the heating devices beginning to preheat the longitudinal wires before the welding electrodes begin returning.

The movement of the heating devices, which travel along with the longitudinal wires, can be controlled in various ways. For example the heating devices may include clamps for engaging the longitudinal wires whereby the heaters are drawn along by the wires, a mechanism, including springs or counterweights being provided for returning the heaters to the initial position.

Three examples of machines, and a number of modifications, are illustrated in the accompanying drawings, in which:

FIG. 6 is an end view of a resistance preheater;

FIG. 7 is an end view of a resistance preheater for preheating a pair of adjacent wires;

FIG. 8 is an end view of a modified form of the preheater of FIG. 7;

FIG. 9 is a side elevation of a heater such as those shown in FIGS. 6 to 8;

Figure 1:
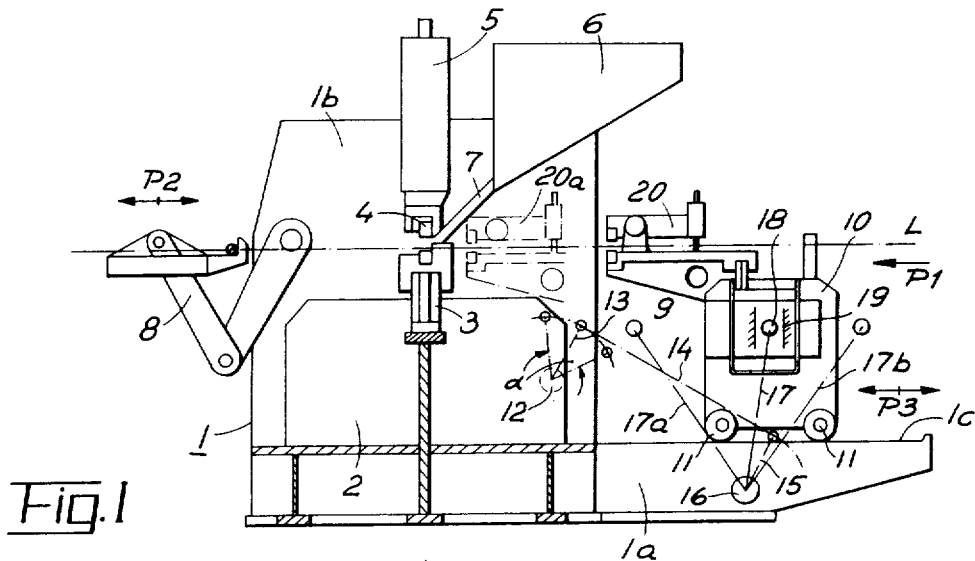
FIG. 1 is a diagrammatic section elevation of the first machine.

The machine shown diagrammatically in FIG. 1 has a machine frame 1 including a base 1a and two side frames 1b, between which there are welding transformers 2, housed in the usual way, a transverse row of lower welding heads 3 and a transverse row of upper welding heads 4, which can be either active electrodes or passive current bridges. The path of travel of the longitudinal wires L extends longitudinally, passing between the two rows 3 and 4 of electrodes. The longitudinal wires are fed through the machine intermittently from right to left, in the direction of the arrow P1, in steps corresponding to the spacing of the transverse wires. A storage container 6 feeds the transverse wires through a feed channel 7 to the welding station between the two rows 3 and 4 of welding heads. The correct timing of these two actions, the longitudinal wire advance and the transverse wire feed, is ensured by a known kind of wire advance drive and control device. In the drawing these have been omitted for the sake of simplicity, for they are not relevant to the present invention. As soon as the longitudinal wires have advanced a step, and a transverse wire has been fed into position between the rows 3 and 4 of welding heads, the welding is effected. For this purpose the welding current is switched on, the crossbeam 5, to which the upper welding heads 4 are attached, is lowered and the transverse wire is welded to the longitudinal wires at the crossing points, in the known way by heat and pressure. When the welding has been completed the welded wire mesh, together with the upstream longitudinal wires, is advanced a further step, in the direction of the arrow P1, by a drive mechanism 8, which is indicated merely diagrammatically in traction hook drawing. The drive mechanism 8 has a tractiohook which engages a transverse wire of the welded grating and pulls the grating one step further forward, the drive mechanism thereupon returning to its initial position. The movement of the traction hook is a forward and backward oscillation, as represented by the arrow P2. All the parts described above are a part of the existing state of the art.

The mesh welding machine is equipped with a travelling preheater for the longitudinal wires. For this purpose, the base 1a of the machine frame 1 supports a system of rails 1c along which run, on wheels 11, heating transformers 10 for the preheating devices. The transformers 10 are driven back and forth by a drive system consisting of an oscillating shaft 12, driven by the welding machine in such a way that the shaft 12 oscillates rotationally through an angle $\alpha$ in step with the working cycle of the welding machine. On the oscillating shaft 12 there is mounted an oscillating arm 13 which is mounted at one end of the shaft 12. The other end of the arm 13 connected, by a connecting rod 14, to a second oscillating arm 15 fixed to a second oscillating transverse shaft 16. The parts 13, 14 and 15 form a linkage which transmits the oscillations of the shaft 12 to the shaft 16. Fixed to the oscillating shaft 16 there is a further oscillating arm 17 whose other end is pivoted to a vertical slider 18, which is free to slide up and down in guides 19 in the travelling transformer assembly 10, 11. The oscillating arm 17 oscillates between the two end positions 17a and 17b, imparting a corresponding back and forth travelling movement to the transformer assembly 10, 11, as indicated by the double arrow P3. The entire drive system described above is preferably duplicated on the other side of the machine. The forward movements of the travelling transformer assembly 10, 11, towards the welding heads, is synchronized with the advance movements of the longitudinal wires L.

The travelling transformer assembly 10, 11 has a bracket 9 which extends out towards the welding heads 3, 4. The bracket supports heating devices 20, which will be described in greater detail below. When the transformer assembly 10, 11 travels forwards with the advancing longitudinal wires, the heating devices, moving along with the wires, preheat each wire along a short axial length of the wire. When the oscillating arm 17 has swung forwards as far as its extreme forward position 17a the preheating devices 20 have reached their extreme forward positions indicated at 20a in FIG. 1, where they are close to the welding heads 3, 4.

The oscillation of the shaft 12 is timed with respect to the wire advance mechanism 8 in such a way that the transformer assembly 10, 11 begins its return movement before the end of the advancing movement of the longitudinal wires, so that while the heating devices are moving backwards the preheated zones in the longitudinal wires continue advancing until they finally come to rest between the rows 3 and 4 of the welding heads. The wires are then brought to a standstill, and welding takes place. During the welding period the heating devices 20 complete their return stroke, and the wire advance mechanism 8 returns to its initial position.

Figure 2:
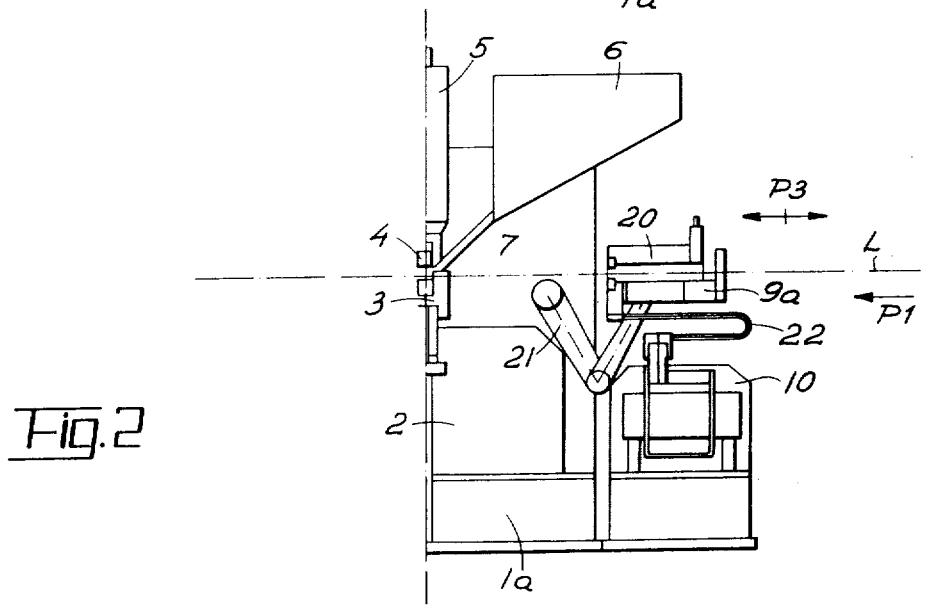
FIG. 2 is a similar view of part of the second machine.

The example shown in FIG. 2 is generally similar to that shown in FIG. 1, except in regard to certain parts which are represented differently in FIG. 2. In the example shown in FIG. 2 the heating transformers 10 are mounted on the stationary base 1a of the machine frame 1, and are electrically connected by flexible conductors 22 to the heating devices 20. A travelling support 9a supports the heating devices 20, the support 9a being driven in its reciprocating movement by a straight line motion oscillating crank drive 21, which can be of similar construction to the wire advance drive 8 shown in FIG. 1. The heating devices 20 move backwards and forwards as indicated by the double arrow P3. A straight line motion driving and guiding device which is particularly suitable for this purpose has been described in the Austrian Pat. No. 252,692.

Figure 3:
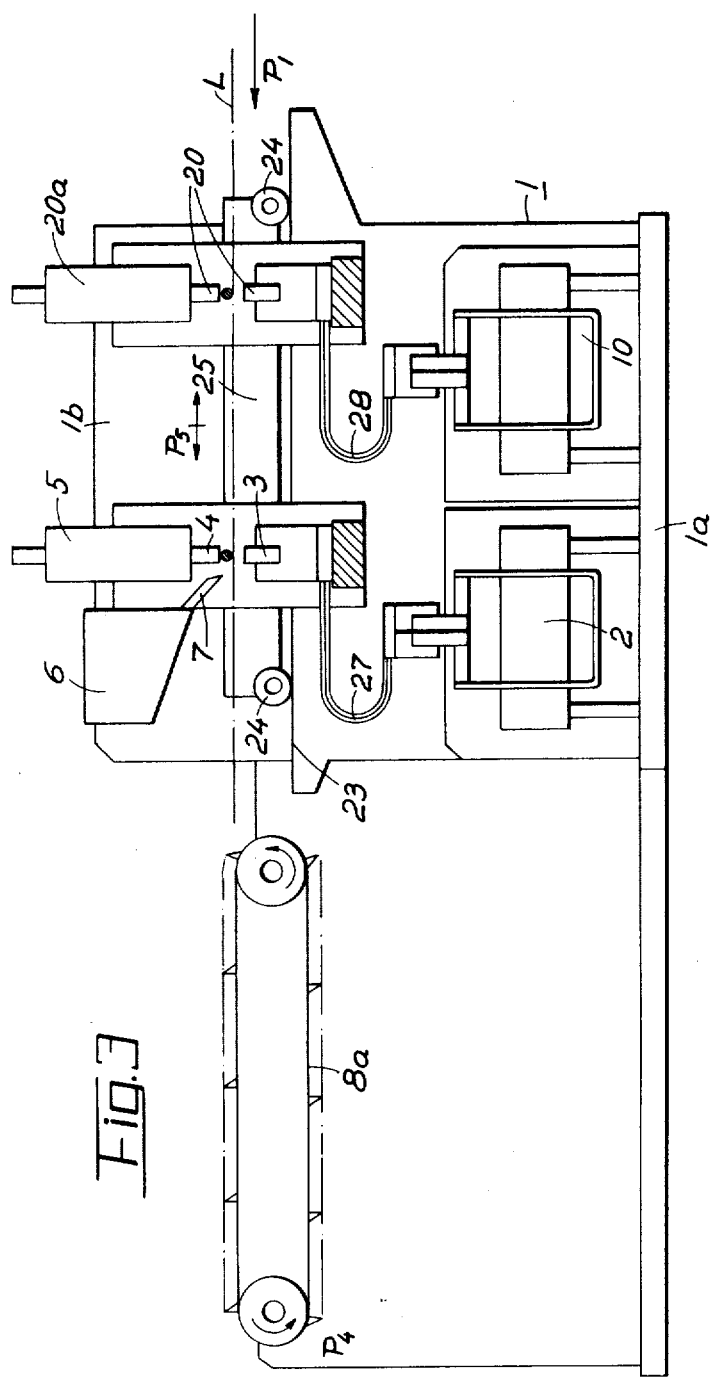
FIG. 3 is a similar view of the first machine.

In the example shown in FIG. 3 the longitudinal wires advance continuously through the welding machine. In this case both the preheating devices and the welding heads travel backwards and forwards. Corresponding reference numerals are used for corresponding parts, compared with FIGS. 1 and 2. The welded mesh and the upstream longitudinal wires are advanced continuously in the direction of the arrow P1 by continuously circulating gripper chains 8a, the chains circulating in the direction indicated by the arrow P4 in FIG. 3.

On the machine frame 1 there is mounted, under the path of travel of the longitudinal wires L, a horizontal rail 23, along which there runs on wheels 24 a carriage 25, the carriage travelling back and forth as indicated by the double arrow P5. The travelling carriage 25 supports, near its front end, the welding assembly consisting of the two rows 3 and 4 of welding heads, the transverse beam 5, the feed hopper 6 for feeding the transverse wires and the feed channel 7 for the transverse wires. Near its rear end the travelling carriage 25 supports the preheating assembly consisting of the preheating devices 20 and, if necessary, a second transverse beam 20a. The distance $t$ between the welding heads 3, 4 and the preheating devices 20 can be adjusted to suit the desired transverse wire spacing by adjusting the positions of the two assemblies on the travelling carriage 25. The welding heads 3, 4 and the preheaters 20 are connected over flexible cables 27 and 28 to the heating transformer 2 and 10, which are fixed to the machine frame 1.

When this machine is in operation the preheating period coincides entirely with the welding period. The cooling off period, that is to say the period of time which elapses after the preheated length of wire has left the preheater and before it reaches the welder, is comparatively short, because the longitudinal wires L are advancing continuously during the return movement of the welding assembly. The amount of heat lost during this interval is therefore comparatively little.

As an alternative, the welding assembly and the preheater assembly can if desired be mounted on separate carriages, so that they can travel independently. In this case the preheating assembly can begin its return movement before the welding assembly begins its return movement, and the preheaters begin heating the longitudinal wires before the welding assembly begins its return movement. This further reduces the heat losses.

Figure 4:
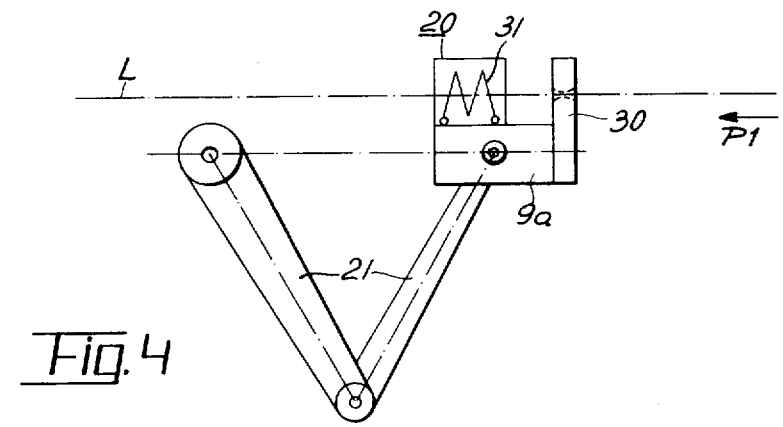
FIG. 4 is a diagrammatic elevation of an induction preheater.

In FIG. 4 a crank system 21 which gives a positively controlled straight line movement drives a support 9a (compare FIG. 2) on which is mounted the preheater device 20. The support 9a has an eye or fork 30 which remains constantly in line with an induction heating coil 31. The longitudinal wire passes through an eye 30 and through the induction heating coil 31. The straight line motion crank system 21 is driven by the machine in step with the longitudinal wire advance drive, so that the preheater 20 advances with the wire.

Figure 5:
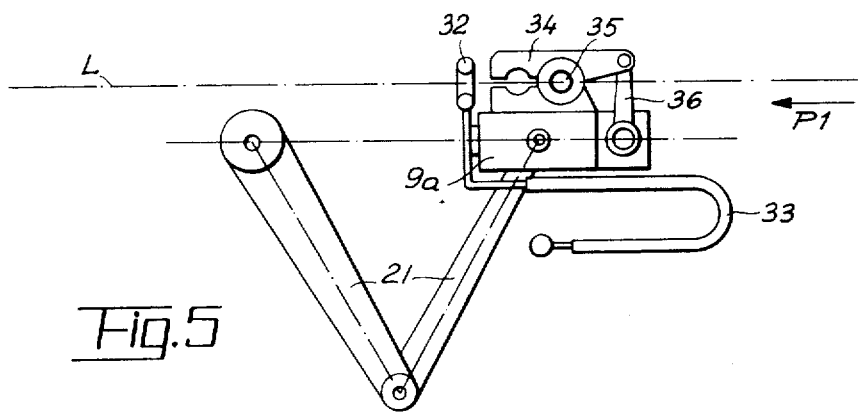
FIG. 5 is a similar view of a gas preheater.

In the example shown in FIG. 5 the preheating is not effected electrically, but rather by burning a fuel in a ring burner 32, which is mounted on the support 9a and fed with a fuel, for example butane gas, through a flexible hose 33. On the support 9a there is mounted a clamp 34. One jaw of the clamp 34 pivots on a pivot pin 35, the jaw being driven in this movement by a driving link 36, so that the jaw rocks in the working rhythm of the machine. In this case the straight line motion crank system 21 is not itself mechanically driven, the preheater 20 being drawn along by the longitudinal wire L during the periods when the clamp 34 is gripping the wire. At the end of the forward stroke of the heating device the clamp 34 opens and the preheating assembly is returned to its initial position by a spring or system of weights or the like. The clamping arrangement can of course if desired be used in conjunction with an electric preheater.

FIGS. 6 to 11 show preheaters which use electric resistance heating. FIGS. 6 to 8 show the longitudinal wires in cross section. FIG. 9 is a side view of a preheating device in which the longitudinal wires are preferably included in pairs in the electric heating circuit. The arrangement shown in FIG. 6 is for heating only one longitudinal wire. A preheater of this kind, for a single wire, is preferably used in those cases where the welded grating contains an odd number of longitudinal wires. In this case all the longitudinal wires except one are heated in pairs, each pair by its own electric heating circuit. The remaining wire is heated individually by its own heating circuit.

A preheating device as shown in FIG. 6, for a single wire, can also be used in those cases where the spacing between the longitudinal wires is too great to allow them to be welded conveniently in pairs, or where the longitudinal wires are unevenly spaced apart.

In all the heaters shown in FIGS. 6 to 9, two electrode blocks 44 and 45 are mounted on the support 9 and are fed with current over electric leads 42 and 43. The electrode blocks 44 and 45 are electrically insulated from each other and from the support 9 by insulating layers 41 and 40. The electric leads 42, 43 are fed with current from bus bars 52, 53 (FIG. 9). In each case the electric circuit includes the longitudinal wires L and a current bridge 46.

In FIG. 6 the current bridge 46 has a rolling contact surface 47 which provides a reliable rolling contact with the surface of the electrode block 45. The contact gap between the two parts 45 and 46 is protected from dirt by a cover plate 48. On the other side of the contact bridge the two surfaces which make electric contact with the wire are V-shaped in cross section, so that the wire is clamped firmly between the contact bridge and the electrode block 44. Contact pressure is applied by a thrust stirrup 49, which is actuated in the working rhythm of the machine. Preheating is effected by electric current flowing through the wire.

FIG. 7 shows an arrangement for preheating a pair of longitudinal wires. The wires are clamped between the two electrode blocks 44, 45 and the current bridge 46. FIG. 8 shows a further development of this arrangement, in which the electrode blocks 44, 45 and the current bridges 46 have several V-shaped grooves, to allow differently spaced pairs of longitudinal wires to be preheated.

As shown in FIG. 9, which is a side view, the two bus bars 52, 53 are electrically insulated against each other and extend transversely across the machine. Each bus bar is electrically bonded to one of the two conductors 42, 43 shown in FIGS. 6 to 8. The thrust stirrup 49 is pivoted at 54, the clamping action being driven by a link 50 actuated by an eccentric. The clamping force is adjustable by means of an adjustment nut 51. A spring, not shown in the drawing, can be interposed to allow for longitudinal wires of different thicknesses.

Figure 10:
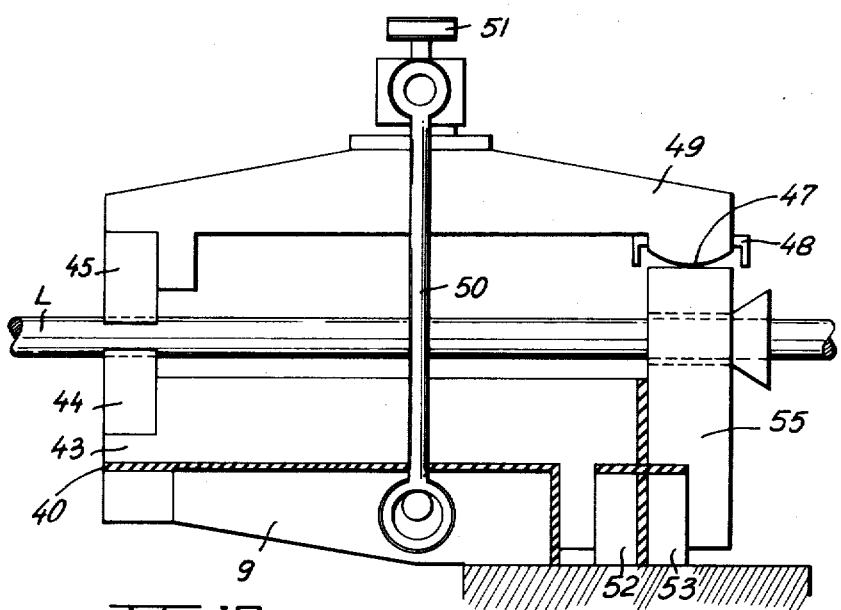
FIG. 10 is a side elevation of a modification of the heater of FIG. 9.
Figure 11:
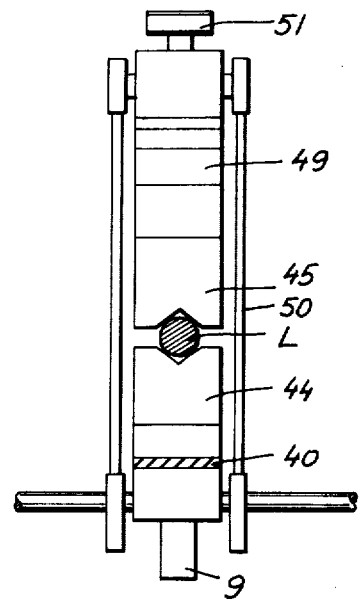
FIG. 11 is an end view of the heater of FIG. 10.

Finally FIGS. 10 and 11 are a side view and a front view of a preheating device for individually preheating the longitudinal wires. Mounted on the support 9 there is an electric lead 43 which is connected to a bus bar 52 and also connected to an electrode 44, the lead 43 being insulated electrically from the support 9. The other electrode 45 is connected to the other bus bar 53 over a thrust rocker 49 and over a connecting piece 55. Electric connection between the rocker 49 and the piece 55 is obtained by means of a rolling contact surface 47, which is protected from dust by cover plates 48. On the other end of the rocker 49 there is mounted the electrode 45.

It would of course be perfectly possible to arrange a system of preheaters in such a way that each longitudinal wire is preheated simultaneously at several different places, two for example. Two transverse wires could then be welded simultaneously across the array of longitudinal wires. The machine would operate in double steps. In this case the connecting piece 55 shown in FIG. 10 would be constructed to act as a second lower electrode, the thrust rocker 49 having no rolling contact surface 47 but acting instead as the second upper electrode.

It should be observed that in the case of the preheaters shown in FIGS. 6 to 11 each longitudinal wire is clamped, during the preheating period, between an electrode and a current bridge, the entire preheating assembly being carried along with the advancing movement of the longitudinal wire. It is therefore not necessary to provide any power drive from the machine for the preheating assemblies. All that is necessary is to provide return springs or the like, which return the preheating assemblies back to their initial positions after the clamping jaws have been opened, releasing the preheaters from the longitudinal wires.

The examples described do not exhaust the possibilities of application of the invention. In particular there can if desired be used heating devices of other kind, for example electric arcs between carbon electrodes.

We claim:

1. A process for manufacturing welded mesh comprising forming an array of longitudinal wires, causing relative movement between said array and a transverse row of electrodes, feeding successively transverse wires against said array at the site of said electrodes welding said transverse wires at successive spaced locations along said array by electric resistance welding, and reciprocably moving a preheating means along with said array to preheat said longitudinal wires at each said successive spaced location along said array prior to welding said transverse wire to said array at that location.

2. A process according to claim 1, wherein said array is advanced in intermittent strokes past said row of electrodes, and said preheating of each successive spaced location along said array of said longitudinal wires is terminated before said location reaches said row of electrodes, said preheating means being returned to its initial position prior to completion of said advancing stroke and commencing preheating said longitudinal wires at the next successive spaced location during said welding of said transverse wire.

3. A process according to claim 1, wherein said array of said longitudinal wires is advanced continuously, said electrodes and said preheating means being alternately advanced with said advancing array and returned to initial positions.

4. A process according to claim 3, wherein said advance and return of said preheating means is out of phase with said advance and return of said electrodes, said preheating means reaching said initial position prior to completion of said advance of said electrodes, preheating of the next of said successive spaced locations along said array being commenced before termination of said advance of said electrodes.

5. A mesh welding machine comprising resistance welding means including a transverse row of electrodes, means for advancing an array of longitudinal wires of said mesh, means for feeding transverse wires to said welding means, said welding means being adapted to weld said transverse wires to said longitudinal wires at successive spaced locations therealong, reciprocable means for preheating said longitudinal wires at said successive spaced locations, movable mounting means for said preheating means adapted to permit said preheating means to travel along with said array during said advance thereof, and means for advancing said preheating means during said advance of said array.

6. A machine according to claim 5 further comprising means for returning said preheating means to an initial position thereof.

7. A machine according to claim 6 wherein said preheating means includes clamps for engaging said longitudinal wires and said means for advancing said preheating means comprises means for operating said clamps whereby said preheating means may be drawn along by said longitudinal wires.

8. A machine according to claim 5, wherein said means for advancing said array of longitudinal wires is adapted to advance said wires in intermittent strokes and said means for advancing said preheating means is adapted to advance said preheating means in intermittent strokes from an initial position to a point short of said electrodes whereby said advancing stroke of said array is longer than that of said preheating means.

9. A machine according to claim 5, wherein said means for advancing said array from said longitudinal wires is adapted to advance said wires continuously, and said machine further comprises means for alternately advancing said electrodes with said array and returning said electrodes to an initial position.

10. A machine according to claim 9, wherein said means for alternately advancing and returning said electrodes is adapted to operate out of phase with said means for advancing said preheating means.

11. A machine according to claim 5, wherein said preheating means comprises induction coils surrounding said longitudinal wires.

12. A machine according to claim 5, wherein said preheating means comprises a plurality of ring burners surrounding said longitudinal wires.

13. A machine according to claim 5, wherein said preheating means comprise electric resistance heaters.

14. A machine according to claim 13, wherein each of said resistance heaters comprises a pair of clamping jaws and said means for advancing said preheaters comprises means for closing said jaws on said longitudinal wires whereby said preheating means is advanced by said wires.

15. A machine according to claim 14, wherein a plurality of grooves are formed in said jaws whereby pairs of adjacent longitudinal wires at different spacings may be gripped by said jaws.

* * * * *